US010800359B2

(12) United States Patent
Matsushita

(10) Patent No.: US 10,800,359 B2
(45) Date of Patent: Oct. 13, 2020

(54) SHORT-RANGE WIRELESS COMMUNICATION SYSTEM AND SHORT-RANGE WIRELESS COMMUNICATION DEVICE

(71) Applicant: DENSO CORPORATION, Kariya, Aichi-pref. (JP)

(72) Inventor: Suguru Matsushita, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 196 days.

(21) Appl. No.: 15/551,992

(22) PCT Filed: Feb. 18, 2016

(86) PCT No.: PCT/JP2016/000843
§ 371 (c)(1),
(2) Date: Aug. 18, 2017

(87) PCT Pub. No.: WO2016/143268
PCT Pub. Date: Sep. 15, 2016

(65) Prior Publication Data
US 2018/0029538 A1 Feb. 1, 2018

(30) Foreign Application Priority Data
Mar. 11, 2015 (JP) ................. 2015-048777

(51) Int. Cl.
*B60R 16/02* (2006.01)
*B60R 16/023* (2006.01)
(Continued)

(52) U.S. Cl.
CPC .......... *B60R 16/023* (2013.01); *B60R 25/245* (2013.01); *H04M 1/6091* (2013.01);
(Continued)

(58) Field of Classification Search
CPC ............... B60R 16/023; B60R 25/245; H04W 52/0245; H04W 52/0219; H04W 52/0216;
(Continued)

(56) References Cited

U.S. PATENT DOCUMENTS

| 6,552,649 | B1 * | 4/2003 | Okada | ................ | B60R 25/2036 |
| | | | | | 307/10.1 |
| 2012/0214472 | A1 * | 8/2012 | Tadayon | ............. | H04B 5/0062 |
| | | | | | 455/418 |
| 2015/0332530 | A1 | 11/2015 | Kishita | | |

FOREIGN PATENT DOCUMENTS

| JP | 2004194036 A | 7/2004 |
| JP | 2010103930 A | 5/2010 |

(Continued)

OTHER PUBLICATIONS

U.S. Appl. No. 15/550,919, filed Aug. 14, 2017, Matsushita.

*Primary Examiner* — Michael V Kerrigan
(74) *Attorney, Agent, or Firm* — Harness, Dickey & Pierce, P.L.C.

(57) ABSTRACT

A short-range wireless communication system mounted on a vehicle includes a master device and slave devices. Each of the master device and slave devices is a short-range wireless communication device that communicates with a mobile terminal located in a communication range to perform a wireless communication. The master device includes a mobile terminal detection unit detecting the mobile terminal located in a communication range of the master device and an activation control unit performing an activation control to activate the slave devices in response to a detection of the mobile terminal by the mobile terminal detection unit. Each slave device is maintained in a deactivated state until activation control is performed by the activation control unit (Continued)

of the master device. Each slave device is activated when the activation control is performed by the activation control unit of the master device.

10 Claims, 6 Drawing Sheets

(51) Int. Cl.
  *B60R 25/24* (2013.01)
  *H04W 52/02* (2009.01)
  *H04M 1/60* (2006.01)
  *H04W 52/28* (2009.01)
  *H04W 84/10* (2009.01)

(52) U.S. Cl.
  CPC ... *H04W 52/0216* (2013.01); *H04W 52/0219* (2013.01); *H04W 52/0245* (2013.01); *H04W 52/28* (2013.01); *H04W 84/10* (2013.01); *H04M 2250/04* (2013.01); *Y02D 70/00* (2018.01); *Y02D 70/10* (2018.01); *Y02D 70/142* (2018.01); *Y02D 70/144* (2018.01)

(58) Field of Classification Search
  CPC ... H04W 52/28; H04W 84/10; H04M 1/6091; H04M 2250/04; Y02D 70/10; Y02D 70/144; Y02D 70/142; Y02D 70/00
  See application file for complete search history.

(56) References Cited

FOREIGN PATENT DOCUMENTS

| | | |
|---|---|---|
| JP | 2011-063961 A1 | 3/2011 |
| JP | 2014130566 A | 7/2014 |
| WO | WO-2014/088061 A1 | 6/2014 |
| WO | WO-2016143269 A1 | 9/2016 |

* cited by examiner

SHORT-RANGE WIRELESS COMMUNICATION SYSTEM AND SHORT-RANGE WIRELESS COMMUNICATION DEVICE

CROSS REFERENCE TO RELATED APPLICATIONS

This application is a U.S. National Phase Application under 35 U.S.C. 371 of International Application No. PCT/JP2016/000843 filed on Feb. 18, 2016 and published in Japanese as WO 2016/143268 A1 on Sept. 15, 2016. This application is based on and claims the benefit of priority from Japanese Patent Application No. 2015-048777 filed on Mar. 11, 2015. The entire disclosures of all of the above applications are incorporated herein by reference.

TECHNICAL FIELD

The present disclosure relates to a short-range wireless communication system used in a vehicle and a short-range wireless communication device included in the short-range wireless communication system.

BACKGROUND ART

Up to now, as disclosed in Patent Literature 1, a technique in which a user receives various services such as a hands-free call through a wireless communication between a mobile terminal carried by the user and a short-range wireless communication device mounted on the vehicle has been known.

PRIOR ART LITERATURE

Patent Literature

Patent Literature 1: JP 2014-130566 A

SUMMARY OF INVENTION

A service using a wireless communication between a mobile terminal and a short-range wireless communication device is not limited to a service used in the vehicle interior, such as the hands-free call disclosed in Patent Literature 1. For example, a demand for services such as a data communication that receives vehicle related data outside the vehicle is also expected. Depending on the type of service, conceivably, there may be a need for a configuration in which multiple short-range wireless communication devices are mounted on the vehicle, and each of the multiple short-range wireless communication devices estimates a position of the mobile terminal according to an strength of radio waves received from the mobile terminal or the like.

However, in the configuration where the multiple short-range wireless communication devices are mounted on the vehicle, if all of the short-range wireless communication devices are kept activated although some communication devices are not necessary, power is wastefully consumed by the unnecessary communication devices.

The present disclosure is made in view of the above difficulties, and it is an object of the present disclosure to provide multiple short-range wireless communication devices mounted on a vehicle and capable of suppressing unnecessary power consumption. It is also an object of the present disclosure to provide a short-range wireless communication system including the multiple short-range wireless communication devices.

According to an aspect of the present disclosure, a short-range wireless communication system mounted on a vehicle includes a master device and slave devices. Each of the master device and slave devices is a short-range wireless communication device that communicates with a mobile terminal located in a communication range to perform a wireless communication. The master device includes a mobile terminal detection unit detecting the mobile terminal located in a communication range of the master device and an activation control unit performing an activation control to activate the slave devices in response to a detection of the mobile terminal by the mobile terminal detection unit. Each slave device is maintained in a deactivated state until activation control is performed by the activation control unit of the master device. Each slave device is activated when the activation control is performed by the activation control unit of the master device.

According to the short-range wireless communication system, the slave devices are not activated until the mobile terminal detection unit detects the mobile terminal located in the communication range of the master device, and the slave devices are activated based on the fact that the mobile terminal detection unit detects the mobile terminals. Therefore, there is no need to keep the multiple slave devices activated. Therefore, unnecessary power consumption can be suppressed as compared with a case where the multiple slave devices are maintained in the activated state. As a result, the useless power consumption can be suppressed in the short-range wireless communication system which includes the multiple short-range wireless communication devices mounted on the vehicle.

According to another aspect of the present disclosure, a short-range wireless communication device, which is mounted on a vehicle and communicates with a mobile terminal located in a communication range to perform a wireless communication, includes a mobile terminal detection unit detecting the mobile terminal located in the communication range and an activation control unit performing an activation control to activate a plurality of different short-range wireless communication devices mounted on the vehicle in response to a detection of the mobile terminal by the mobile terminal detection unit.

According to this configuration, the short-range wireless communication devices mounted on the vehicle other than the subject device mounted on the vehicle are not activated until the mobile terminal detection unit detects the mobile terminal located in the communication range of the subject device, and the short-range wireless communication devices other than the subject device are activated in response to the detection of the mobile terminal by the mobile terminal detection unit. Therefore, there is no need to keep the multiple short-range wireless communication devices other than the subject device activated. Therefore, the unnecessary power consumption can be suppressed as compared with the case where the multiple short-range wireless communication devices other than the subject device are maintained in the activated state. As a result, the useless power consumption is suppressed in the short-range wireless communication system which includes the multiple short-range wireless communication devices mounted on the vehicle.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
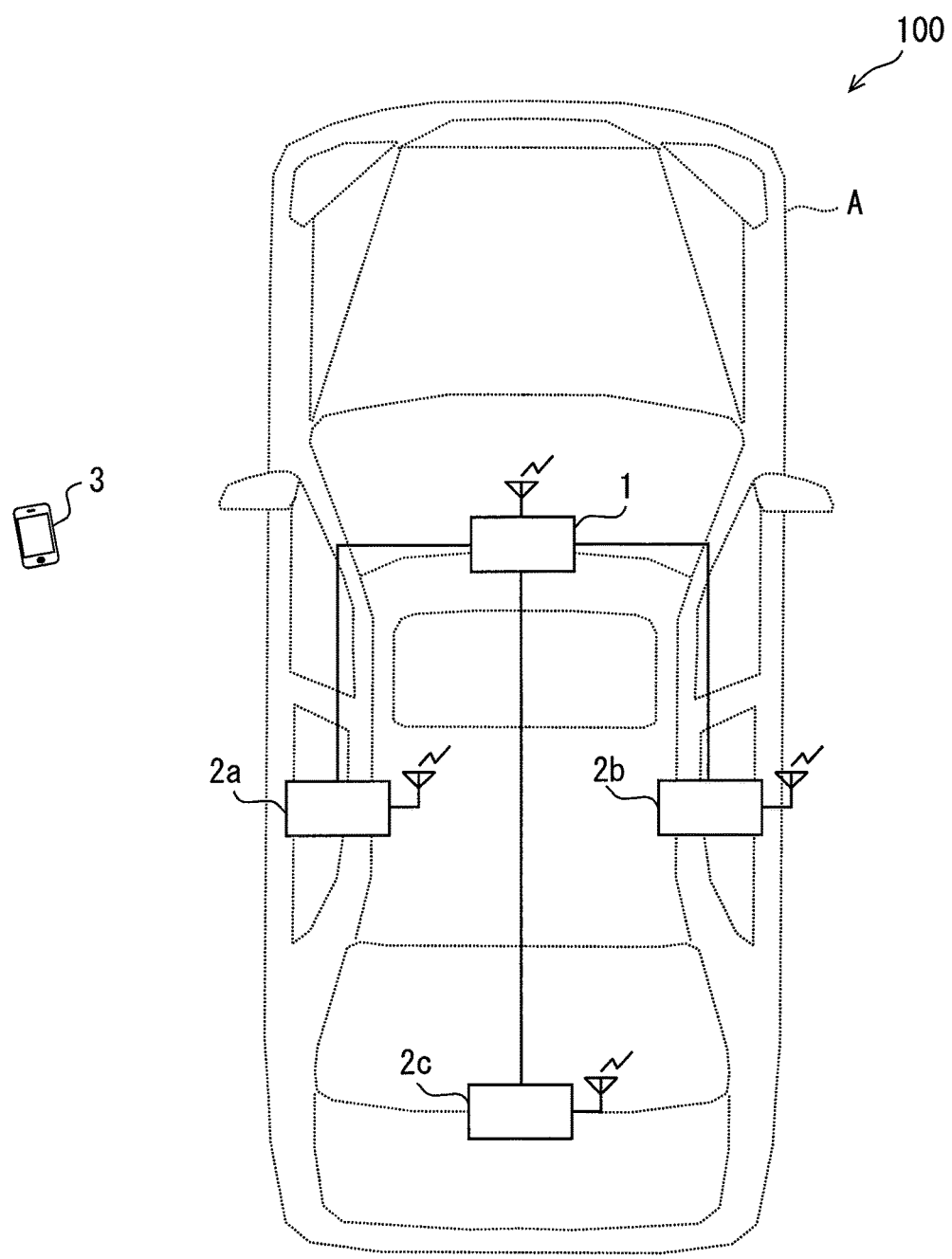
FIG. 1 is a diagram illustrating an example of a schematic configuration of a short-range wireless communication system according to an aspect of the present disclosure.

Hereinafter, embodiments of the present disclosure will be described with reference to the accompanying drawings. FIG. 1 is a diagram illustrating an example of a schematic configuration of a short-range wireless communication system 100 according to the present disclosure. As illustrated in FIG. 1, the short-range wireless communication system 100 includes a short-range wireless communication device (hereinafter referred to as "master device 1") as a master device mounted on a vehicle A, multiple short-range wireless communication devices (hereinafter referred to as "slave devices 2a to 2c") as slave devices mounted on the vehicle A, and a mobile terminal 3. The master device 1 is connected to the slave devices 2a to 2c through, for example, a vehicle LAN or the like. The master device and the slave devices 2a to 2c configure a short-range wireless communication system.

The mobile terminal 3 may be provided by, for example, a multifunctional cellular phone that can be carried by a user. As described above, each of the master device 1 and the slave devices 2a to 2c is mounted on the vehicle A, and is configured to establish a communication connection with the mobile terminal 3 located in the communication range of a subject device to perform a wireless communication. In addition, the master device 1 controls the activation of the slave devices 2a to 2c, and each slave device 2a to 2c controls a device mounted on the vehicle A to perform a service through the wireless communication with the mobile terminal 3.

For example, the service may include a hands-free call using a speaker and a microphone mounted on the vehicle A in place of a telephone conversation through the mobile terminal 3. The service may include an audio streaming which playbacks an audio file stored in the mobile terminal 3 using vehicle mounted audio device. The service may include a data communication in which the mobile terminal 3 acquires information from the device of the vehicle A and performs remote operation for operating the device of the vehicle A. As examples of the information acquired by the mobile terminal 3 in the data communication, there are an average fuel consumption of the vehicle A, a travel distance, a tire air pressure, and the like. As an example of the remote operation, there is an operation of activating the car air conditioner from outside of the vehicle.

The slave devices 2a to 2c are mounted at respective different positions of the vehicle A, and the communication ranges of respective slave devices 2a to 2c are different from each other. For example, the slave device 2a is mounted at a position closer to a left side of the vehicle A, and has a communication range covering from the vehicle inside space closer to the left side of the vehicle A to the outside of the vehicle. The slave device 2b is mounted at a position closer to the right side of the vehicle A, and has a communication range covering from the vehicle inside space closer to the right side of the vehicle A to the outside of the vehicle. The slave device 2c is mounted at a position closer to a rear of the vehicle A, and has a communication range covering from the vehicle inside space closer to the rear of the vehicle A to the outside of the vehicle.

In the following description, when there is no need to distinguish the slave devices 2a to 2c from each other, those slave devices 2a to 2c will be referred to as slave devices 2. In the present embodiment, the short-range wireless communication system 100 includes three slave devices 2a to 2c, but the present disclosure is not necessarily limited to such a configuration, and in the case where the multiple slave devices 2 to 2c are provided, the number of slave devices 2 other than the three slave devices may be included in the short-range wireless communication system 100.

Figure 2:
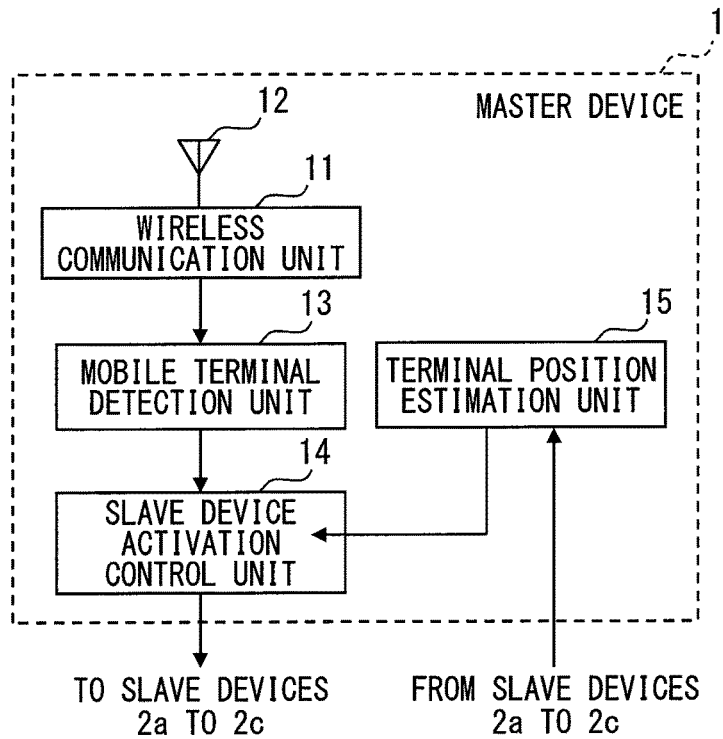
FIG. 2 is a functional block diagram illustrating an example of a schematic configuration of a master device.

The following will describe an example of a schematic configuration of the master device 1 with reference to FIG. 2. As illustrated in FIG. 2, the master device 1 includes a wireless communication unit 11, a mobile terminal detection unit 13, a slave device activation control unit 14, and a terminal position estimation unit 15.

The wireless communication unit 11 has an antenna 12 and performs a short-range wireless communication with the mobile terminal 3 with a communication range of, for example, about several tens of meters at most. It is preferable that the communication range of the wireless communication unit 11 covers the entire circumference of the vehicle A so as to detect the mobile terminal 3 located in any direction of the vehicle A. It is preferable that the communication range of the wireless communication unit 11 is set to a range limited within the vicinity of the vehicle A, such as a range within one meter or several meters from the vehicle A so as not to detect the mobile terminal 3 of a user who is far from the vehicle A.

The antenna 12 is configured by, for example, a transmission/reception antenna. Alternatively, the wireless communication unit 11 may include a transmission antenna and a reception antenna. As the short-range wireless communication, from the viewpoint of convenience, it is preferable to employ the short-range wireless communication according to a short-range wireless communication standard such as Bluetooth (registered trademark) or Wi-Fi (registered trademark) standardly used in a multifunctional cellular phone.

Besides, in the electronic key system such as a smart entry system, in order to use the mobile terminal 3 in place of an electronic key and use the wireless communication unit 11 in place of a wireless communication unit used in the electronic key system, the short-range wireless communication using a UHF band may be employed.

The mobile terminal detection unit 13 detects the mobile terminal 3 already registered in the master device 1 when the mobile terminal 3 is located in the communication range of the master device 1. For example, it is assumed that the registration is performed by storing a code for identifying the mobile terminal 3 in a nonvolatile memory of the master device 1. Whether the code is registered or not, may be determined based on whether the code stored in the master device 1 matches a code of the mobile terminal 3 received by the wireless communication unit 11 or not. When the wireless communication unit 11 establishes the communication connection with the registered mobile terminal 3, the mobile terminal detection unit 13 detects the registered mobile terminal 3 located in the communication range. The term "communication connection" as used in the present disclosure is indicative of a state in which a connection is established according to a communication protocol.

Further, even when the mobile terminal detection unit 13 receives the radio waves from the registered mobile terminal 3 and the received signal strength indicator (that is, RSSI) is equal to or higher than a threshold, the mobile terminal detection unit 13 detects the registered mobile terminal 3 located in the communication range. The threshold referred to in the present disclosure can arbitrarily be set according to the detection range of the mobile terminal 3 from the vehicle A.

The slave device activation control unit 14 controls the activation of the slave devices 2. The slave device activation control unit 14 may be also referred to as an activation control unit. The activation of the slave devices 2 may be controlled by switching on and off a power supply to the slave devices 2. In the present embodiment, an example in which the activation of the slave devices 2 is controlled by transmitting an instruction to the slave devices 2 will be described below. The slave device activation control unit 14 activates the slave device 2 in response to the detection of the mobile terminal 3 by the mobile terminal detection unit 13. The processing executed by the slave device activation control unit 14 will be described in detail later.

The terminal position estimation unit 15 estimates a position of the mobile terminal 3 relative to the slave device 2 based on the information transmitted from the slave device 2. The processing executed by the terminal position estimation unit 15 will also be described in detail later.

Figure 3:
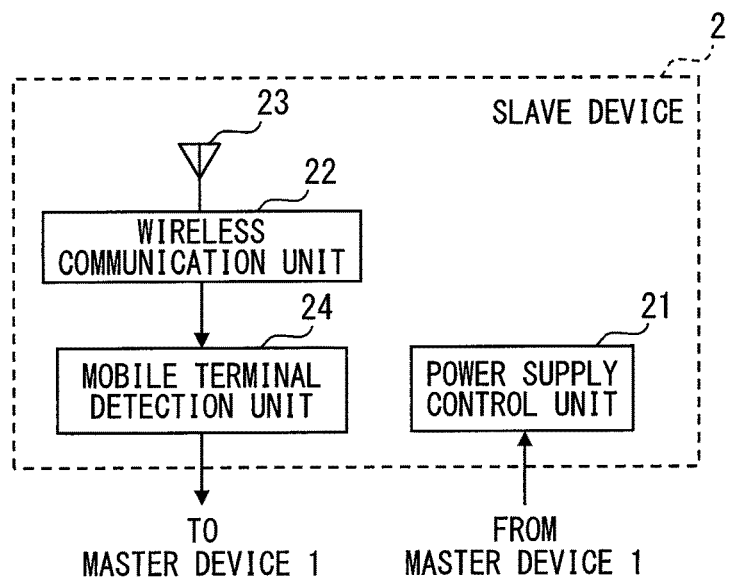
FIG. 3 is a functional block diagram illustrating an example of a schematic configuration of a slave device.

Subsequently, an example of a schematic configuration of each slave device 2 will be described with reference to FIG. 3. As illustrated in FIG. 3, the slave device 2 includes a power supply control unit 21, a wireless communication unit 22, and a mobile terminal detection unit 24. In FIG. 3, a description of members that are responsible for functions related to services using wireless communication is omitted.

The power supply control unit 21 switches on and off a power supply of the subject device according to an instruction from the master device 1. When the power supply control unit 21 turns on the power supply, the subject device is activated and the wireless communication is enabled. When the power supply control unit 21 switches off the power supply, the subject device stops operation and the wireless communication is disabled. As an example, the slave device 2 may be configured to be in a sleep state until the power supply is turned on.

The wireless communication unit 22 has an antenna 23 and performs a short-range wireless communication with the mobile terminal 3 with a communication range of, for example, about several meters at most. Similarly to the mobile terminal detection unit 13, the mobile terminal detection unit 24 detects the mobile terminal 3 that has already been registered in the slave device 2 when the mobile terminal 3 is located in the communication range of the subject device. In addition, when the mobile terminal detection unit 24 receives radio waves from the registered mobile terminal 3, the mobile terminal detection unit 24 transmits an RSSI of the received radio waves to the master device 1.

Figure 4:
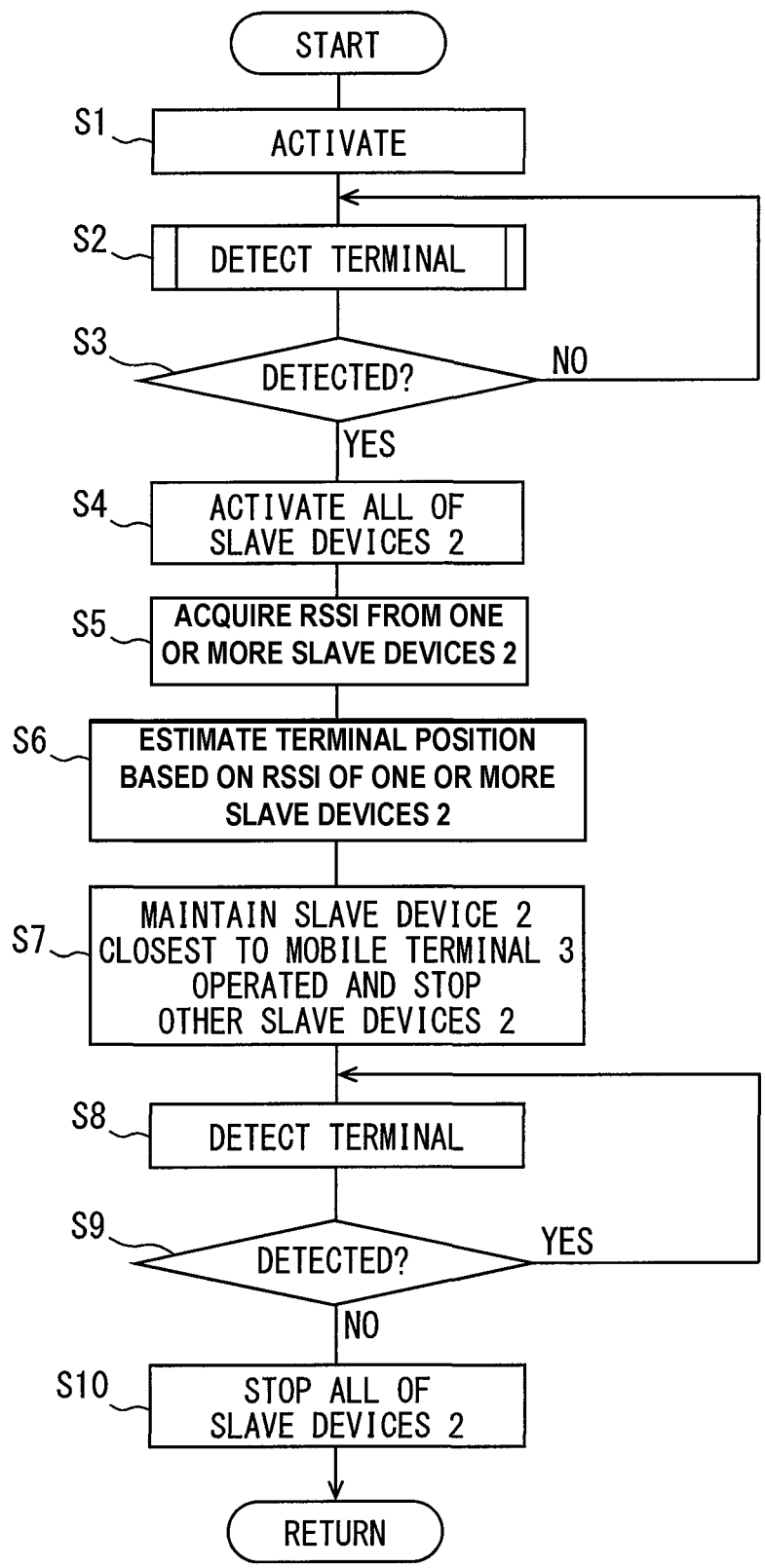
FIG. 4 is a flowchart illustrating an example of a flow of a slave device activation control-related process in the master device.

Subsequently, an example of a flow of the slave device activation control-related process, which is a process related to the control of activation of the slave device 2 in the master device 1, will be described with reference to a flowchart of FIG. 4. The flowchart of FIG. 4 may be configured to start by the master device 1, for example, when the power supply of the master device 1 is turned on and to end when the power supply of the master device 1 is turned off. When a user-operable switch for switching use of the master device 1 and the slave device 2 is provided to a user, the flowchart may be started when the user operates the switch to activate the use of the master device 1 and the slave device 2. The flowchart may be ended when the user operates the switch to deactivate the use of the master device 1 and the slave device 2. In addition, a default state of each slave device 2a to 2c is a deactivated state.

Figure 5:
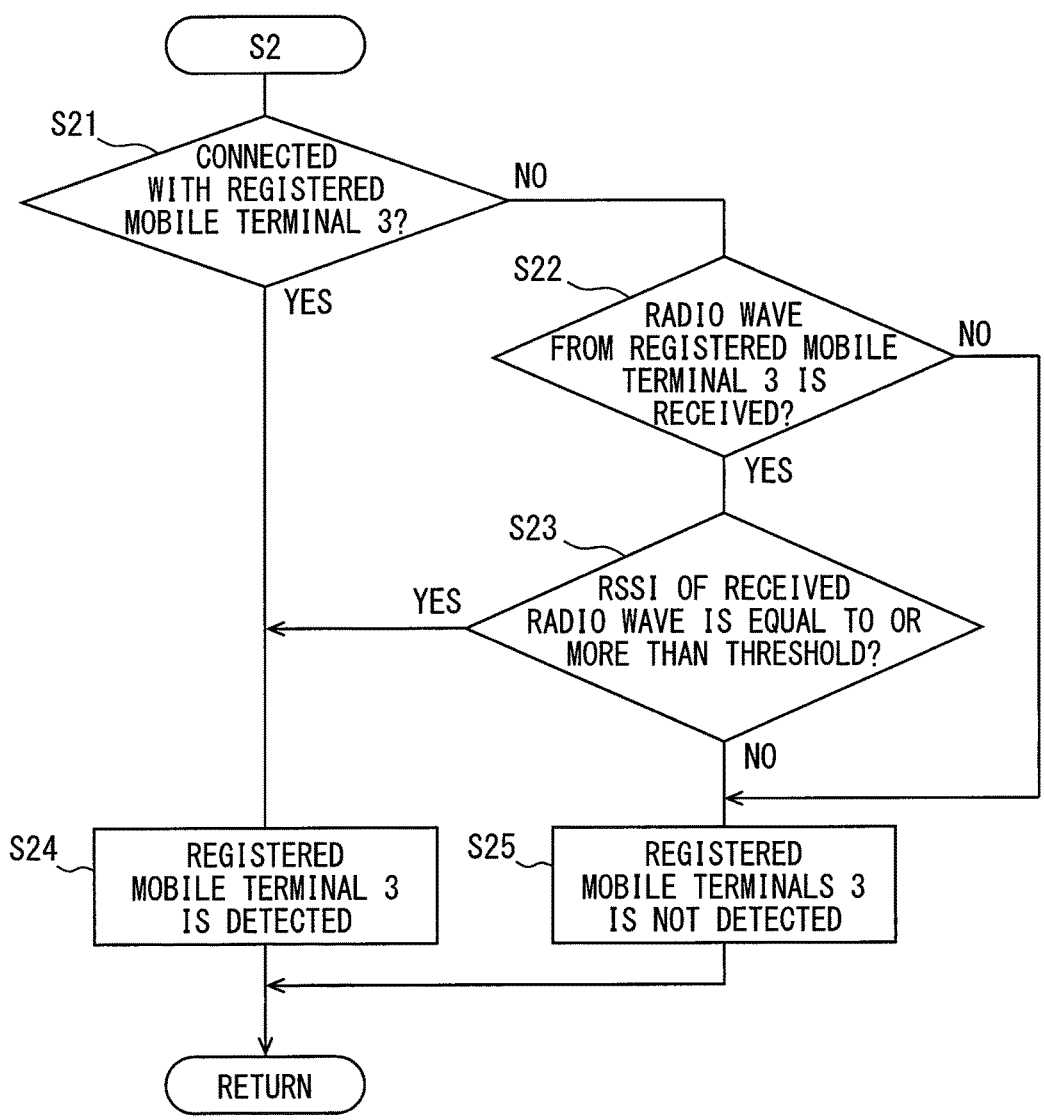
FIG. 5 is a flowchart illustrating an example of a flow of terminal detection in the slave device activation control-related process.

First, in step S1, the master device 1 is activated. In step S2, the mobile terminal detection unit 13 performs detection of the registered mobile terminal 3 (hereinafter referred to as "terminal detection"). Now, with reference to a flowchart of FIG. 5, an outline of the terminal detection executed by the mobile terminal detection unit 13 will be described.

First, in step S21, when the wireless communication unit 11 establishes a communication connection with the registered mobile terminal 3 (YES in S21), the process proceeds to step S24. On the other hand, when the wireless communication unit 11 fails to establish the communication connection with the registered mobile terminal 3 (NO in S21), the process proceeds to step S22.

In step S22, when the wireless communication unit 11 has received the radio waves from the registered mobile terminal 3 (YES in step S22), the process proceeds to step S23. On the other hand, if the wireless communication unit 11 has not received the radio waves from the registered mobile terminal 3 (NO in step S22), the process proceeds to step S25.

In step S23, when the RSSI of the radio waves received from the registered mobile terminal 3 is equal to or more than a threshold (YES in step S23), the process proceeds to step S24. On the other hand, when the RSSI of the radio waves received from the registered mobile terminal 3 is less than the threshold (NO in step S23), the process proceeds to step S25.

In step S24, it is determined that the registered mobile terminal 3 is detected, and the process proceeds to step S3. In step S25, it is determined that the registered mobile terminal 3 is not detected, and the process proceeds to step S3.

Returning to FIG. 4, in step S3, if the registered mobile terminal 3 is detected (YES in S3), the process proceeds to step S4. On the other hand, if the registered mobile terminal 3 is not detected (NO in S3), the process returns to S2 and the process is repeated.

In step S4, the slave device activation control unit 14 activates all of the slave devices 2 (that is, slave devices 2a to 2c). As an example, it is assumed that all of the slave devices 2 are activated at the same time. The term "the same time" as used in the present disclosure may include a deviation caused by error. When the activated slave devices 2a to 2c receive the radio waves from the mobile terminal 3, the slave devices 2a to 2c transmit the RSSI of the radio waves to the master device 1.

In step S5, when receiving the RSSI transmitted from any slave device 2, the terminal position estimation unit 15 acquires the RSSI. In step S6, the terminal position estimation unit 15 estimates a position of (hereinafter referred to as "terminal position") of the mobile terminal 3 relative to the slave device 2 based on the RSSI which is transmitted from the slave device 2 in S5. As an example, if the terminal position estimation unit 15 can acquire the RSSI from only one of the slave devices 2a to 2c, the terminal position estimation unit 15 estimates that the mobile terminal 3 is located at a position closest to the slave device 2 from which the RSSI is acquired. Further, when the terminal position estimation unit 15 has acquired multiple records of RSSI from multiple slave devices 2 among the slave devices 2a to 2c, the terminal position estimation unit 15 estimates that the mobile terminal 3 is located closer to the slave device 2 from which a larger RSSI value is transmitted.

In step S7, the slave device activation control unit 14 stops the activation of the slave devices 2 other than the slave device 2 closest to the mobile terminal 3 based on the terminal position estimated in S6. When the slave device 2 closest to the mobile terminal 3 is the slave device 2a, the slave device 2a is activated and the slave devices 2b and 2c are maintained in deactivated state. Then, the above service is executed by the wireless communication between the slave device 2 whose activation is allowed and the mobile terminal 3.

In step S8, similarly to S2, the mobile terminal detection unit 13 performs terminal detection. In step S9, if the registered mobile terminal 3 is detected in the terminal detection (YES in S9), the process returns to S8 and the process is repeated. On the other hand, if the registered mobile terminal 3 is not detected (NO in S9), the process proceeds to S10. In step S10, the slave device activation control unit 14 deactivates the slave device 2 that has been activated so that all of the slave devices 2 are in deactivated states. Then, the process returns to S2 and the process is repeated.

Figure 6:
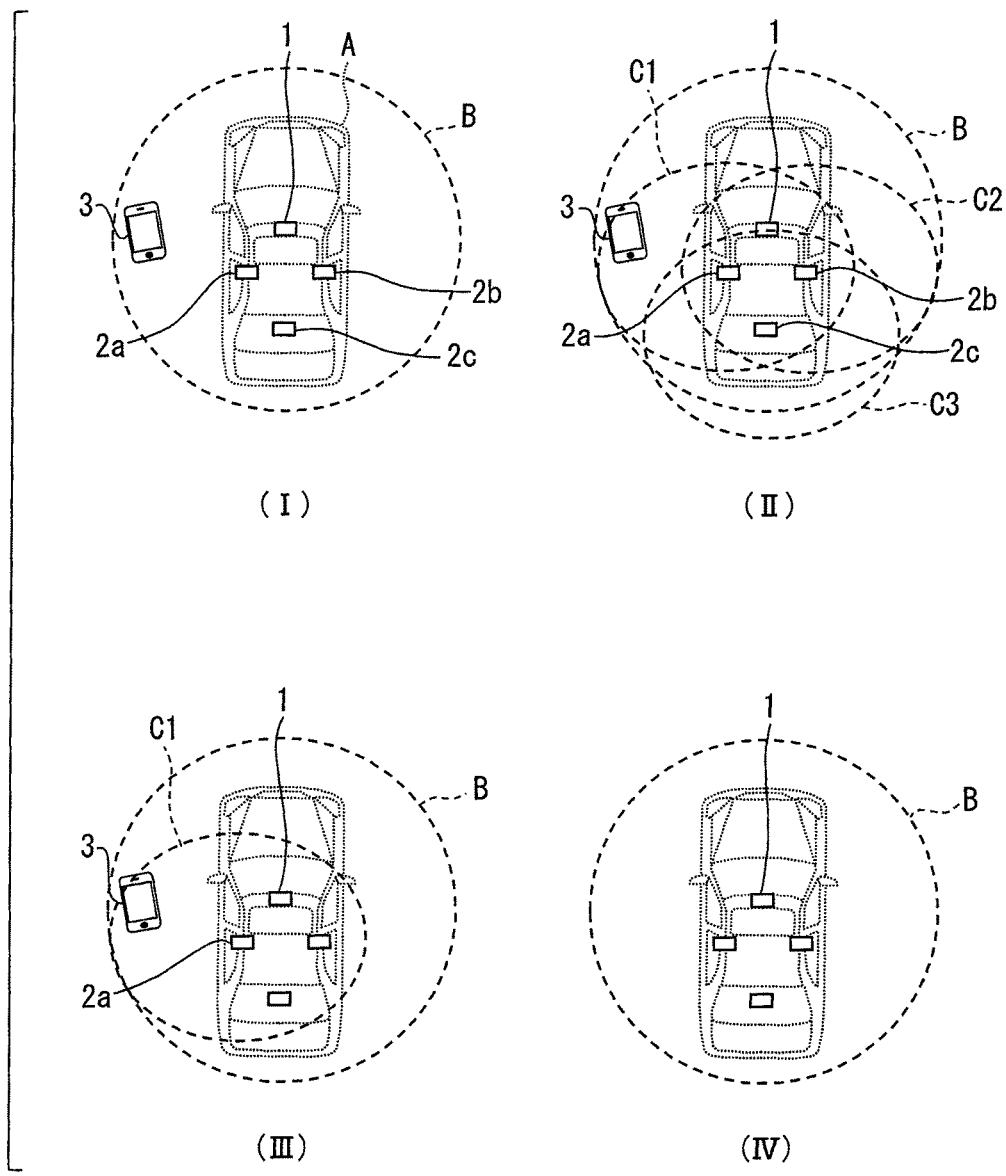
FIG. 6 is a schematic diagram illustrating an example of a transition of activation states of the master device and multiple slave devices according to a first embodiment.

The following will describe an example of the transition of the activation states of the master device 1 and the slave devices 2a to 2c with reference to FIG. 6. The transition is performed in the order of (I), (II), (III), and (IV) in FIG. 6. In (I) to (IV) of FIG. 6, an example in which the mobile terminal 3 is initially located at a position close to the slave device 2a and thereafter no longer exists in the vicinity of the vehicle A will be described. In (I) to (IV) of FIG. 6, symbol B represents a communication range of the master device 1, C1 represents a communication range of the slave device 2a, C2 represents a communication range of the slave device 2b, and C3 represents a communication range of the slave device 2c.

Initially, only the master device 1 is activated while the slave devices 2a to 2c are in deactivated state. In this situation, when the mobile terminal 3 located in the communication range B of the master device 1 is detected in the terminal detection performed by the master device 1, the slave devices 2a to 2c are activated at the same time. Subsequently, based on the RSSI of the radio waves transmitted from the mobile terminal 3 and received by the activated slave devices 2a to 2c, the slave device 2a closest to the mobile terminal 3 is kept activated, while the slave devices 2b and 2c are deactivated. When the mobile terminal 3 is no longer detected by the terminal detection of the master device 1, the slave device 2a is also deactivated and all of the slave devices 2a to 2c are set to the deactivated states.

According to the configuration of the first embodiment, until the registered mobile terminal 3 is detected by the mobile terminal detection unit 13 of the master device 1, the slave devices 2a to 2c are not activated. When the registered mobile terminal is detected by the mobile terminal detection unit 13, the slave devices 2a to 2c are activated. As a result, there is no need to keep the multiple slave devices 2a to 2c in activated state. Hence, unnecessary power consumption can be suppressed as compared with a case where the multiple slave devices 2a to 2c are maintained in activated states.

In addition, when activating the multiple slaves 2a to 2c, the slave device activation control unit 14 activates all of the slaves 2a to 2c at the same time. Therefore, a time taken to estimate the position of the mobile terminal 3 relative to the slave device 2 based on the RSSI from the slave devices 2a to 2c can be shortened as compared with a case of starting the slave devices 2a to 2c in an order one by one.

In addition, the slave device activation control unit 14 keeps the slave device 2 closest to the mobile terminal 3 activated while the other slave devices 2 are deactivated. There is a high possibility that the slave device 2 closest to the mobile terminal 3 is an appropriate slave device 2 for implementing a service through a wireless communication with the mobile terminal 3. Therefore, according to the configuration of the first embodiment, the slave devices 2 other than the slave device 2 that is appropriate for executing the service through the wireless communication with the mobile terminal 3 are deactivated, thereby being capable of suppressing the power consumption more effectively.

Furthermore, according to the configuration of the first embodiment, if the registered mobile terminal 3 is no longer detected by the mobile terminal detection unit 13 after the slave device 2 is activated, all of the slave devices 2 are deactivated. Hence, when the registered mobile terminal 3 is not located in the vicinity of the vehicle A and a necessity to allow the slave device 2 to perform a wirelessly communication becomes low, all of the slave devices 2 are deactivated, thereby being capable of suppressing the unnecessary power consumption.

First Modification

In the first embodiment, when the mobile terminal 3 is detected by the terminal detection of the mobile terminal detection unit 13, the slave device activation control unit 14 activates all of the slave devices 2 at the same time. However, the present disclosure is not limited to the above configuration. For example, a configuration (hereinafter referred to as first modification) in which the slave devices 2 are activated in order one by one may be used. For convenience of description, in the description subsequent to the first modification, members having the same functions as those of the members illustrated in the drawings used hereinbefore are denoted by identical symbols, and their description will be omitted.

For example, in first modification, when the mobile terminal 3 is detected by the terminal detection of the mobile terminal detection unit 13, the slave device activation control unit 14 may actuate the slave devices 2a to 2c sequentially at regular time intervals. The regular time intervals used in the present disclosure represents intervals which cannot be regarded as the same time, and may be set to, for example, 100 milliseconds or 1 second.

Figure 7:
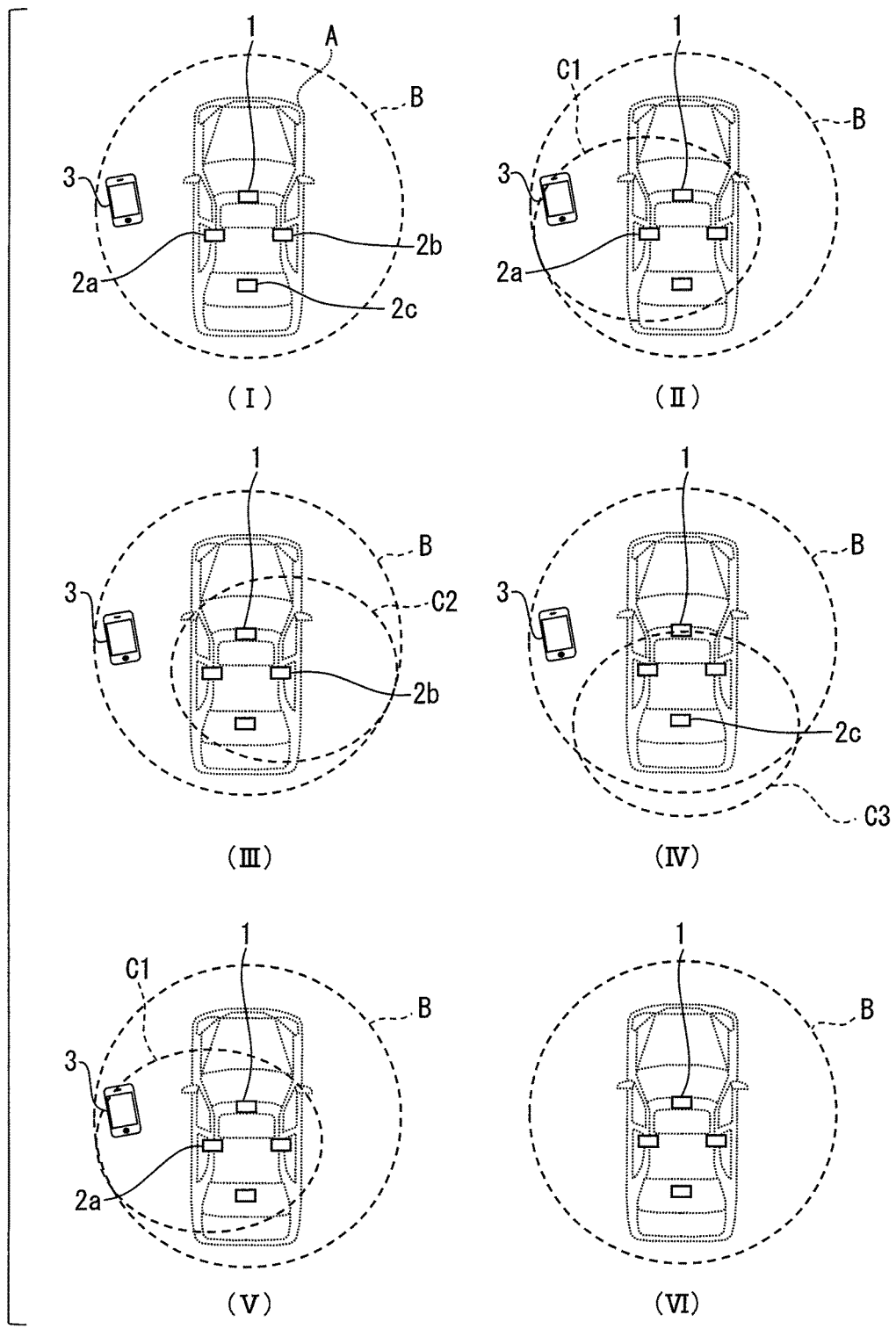
FIG. 7 is a schematic diagram illustrating an example of a transition of activation states of the master device and multiple slave devices according to the first modification.

The following will describe an example of the transition of the activation states of the master device 1 and the slave devices 2a to 2c in the first modification with reference to FIG. 7. The transition is performed in the order of (I), (II), (III), (IV), (V), and (VI) in FIG. 7. In (I) to (VI) of FIG. 7, an example in which the mobile terminal 3 is initially located at a position closest to the slave device 2a and thereafter no longer exists in the vicinity of the vehicle A will be described. In (I) to (VI) of FIG. 7, symbol B represents a communication range of the master device 1, C1 represents a communication range of the slave device 2a, C2 represents a communication range of the slave device 2b, and C3 represents a communication range of the slave device 2c. Further, in (I) to (VI) of FIG. 7, a case in which the slave device 2a, the slave device 2b, and the slave device 2c are activated in the stated order will be described as an example.

Initially, only the master device 1 is activated while the slave devices 2a to 2c are maintained in the deactivated states. In this situation, when the mobile terminal 3 located in the communication range B of the master device 1 is detected by the terminal detection of the master device 1, the slave device 2a, the slave device 2b, and the slave device 2c are activated at the regular time intervals in the stated order one by one. Specifically, the slave devices 2b and 2c are set to the deactivated states when the slave device 2a is activated, the slave devices 2a and 2c are set to deactivated states when the slave device 2b is activated, and the slave devices 2a and 2b are set to deactivated states when the slave device 2c is activated.

Subsequently, based on the RSSI of the radio waves transmitted from the mobile terminal 3 and received by the activated slave devices 2a, 2b, and 2c, the slave device 2a closest to the mobile terminal 3 is set to the activated state, and the slave devices 2b and 2c are set to the deactivated states. When the mobile terminal 3 is no longer detected by the terminal detection of the master device 1, the slave device 2a is also deactivated and all of the slave devices 2a to 2c are deactivated.

When the slave device 2a, the slave device 2b, and the slave device 2c are activated in the stated order, the slave device 2 has been activated may be maintained in the activated state when the next slave device 2 is activated.

Second Modification

The terminal detection executed by the mobile terminal detection unit 13 of the master device 1 may be configured to satisfy no condition, such as whether the RSSI of the radio waves received from the registered mobile terminal 3 is equal to or more than the threshold or not. In that case, in the flowchart of FIG. 5, the processing of S22 and S23 may be omitted, and if the determination in S21 is negative, the process may proceed to S25.

Third Modification

The terminal detection executed by the mobile terminal detection unit 13 of the master device 1 may be configured to satisfy no condition, such as whether the wireless communication unit 11 has established the communication connection with the registered mobile terminal 3 or not. In that case, in the flowchart of FIG. 5, the processing of S21 may be omitted, and the process may be shifted from S2 to S22.

Fourth Modification

In the first embodiment, the activation of the master device 1 is kept even when the slave devices 2 other than the slave device 2 closest to the mobile terminal 3 are deactivated, but the present disclosure is not limited to the above configuration. For example, a configuration (hereinafter referred to as "fourth modification") in which the master device 1 is also deactivated when the slave devices 2 other than the slave device 2 closest to the mobile terminal 3 are deactivated.

In the above configuration, when the mobile terminal 3 cannot be detected by the terminal detection executed by the activated slave device 2, the master device 1 may be restarted and the activated slave device 2 may be set to deactivated state. The reactivation of the master device 1 may be performed by transmitting an instruction from the activated slave device 2 or turning on the power supply of the master device 1. In addition, the deactivation of the slave device 2 may be performed according to an instruction from the own slave device 2, or may be performed according to an instruction from the reactivated master device 1 or by turning off the power supply of the slave device.

According to the configuration of fourth modification, when the slave device 2 located closest to the mobile terminal 3 wirelessly communicates with the mobile terminal 3 to implement the above-described service, the master device 1 can be deactivated. Therefore, the power consumption can be suppressed as compared with a case in which the master device 1 is maintained in the activated state.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

The invention claimed is:

1. A short-range wireless communication system mounted on a vehicle comprising:
a first wireless communication device; and
a plurality of second wireless communication devices, wherein
each of the first wireless communication device and the plurality of second wireless communication devices is a short-range wireless communication device that communicates with a mobile terminal located in a communication range of the first wireless communication device to perform a wireless communication,
the first wireless communication device is configured to:
detect the mobile terminal located in the communication range of the first wireless communication device; and
perform an activation control to activate the plurality of second wireless communication devices in response to a detection of the mobile terminal by the first wireless communication device,
each of the plurality of second wireless communication devices is maintained in a deactivated state until the activation control is performed by the first wireless communication device, and
each of the plurality of second wireless communication devices is activated when the activation control is performed by the first wireless communication device,
the communication range of the first wireless communication device covers an outside of the vehicle,
the wireless communication performed by a respective second wireless communication device includes receiving, at the respective second wireless communication device, radio waves transmitted from the mobile terminal, and
the first wireless communication device estimates a location of the mobile terminal on the outside of the vehicle based on results of the receiving the radio waves transmitted from the mobile terminal at the plurality of second wireless communication devices activated by the first wireless communication device.

2. The short-range wireless communication system according to claim 1, wherein
the communication range of the first wireless communication device covers an entire circumferential volume of the vehicle.

3. The short-range wireless communication system according to claim 1, wherein
the first wireless communication device detects the mobile terminal by establishing a communication connection with the mobile terminal.

4. The short-range wireless communication system according to claim 1, wherein
the first wireless communication device determines a detection of the mobile terminal when a strength of radio waves transmitted from the mobile terminal is equal to or more than a threshold value.

5. The short-range wireless communication system according to claim 1, wherein
the first wireless communication device simultaneously activates all of the plurality of second wireless communication devices.

6. The short-range wireless communication system according to claim 1, wherein
the first wireless communication device sequentially activates the plurality of second wireless communication devices one at a time.

7. The short-range wireless communication system according to claim 1, wherein
the first wireless communication device estimates which one of the plurality of second wireless communication devices is closest to the mobile terminal based on radio waves transmitted from the mobile terminal and forwarded by the plurality of second wireless communication devices, to the first wireless communication device, and
the first wireless communication device maintains an activated state of the one of the plurality of second wireless communication devices estimated to be the closest to the mobile terminal by the first wireless communication device and deactivates the remaining second wireless communication devices other than the second wireless communication device estimated to be the closest to the mobile terminal.

8. The short-range wireless communication system according to claim 1, wherein
the first wireless communication device maintains an activated state of each of the plurality of second wireless communication devices after the plurality of second wireless communication devices are activated by the first wireless communication device, and
the first wireless communication device further performs a deactivation control to deactivate the plurality of second wireless communication devices when the first wireless communication device no longer detects the mobile terminal after the plurality of second wireless communication devices are activated.

9. A method performed with a short-range wireless communication system mounted on a vehicle for estimating a location of a mobile terminal on an outside of the vehicle,
wherein
the short-range wireless communication system includes a first wireless communication device and a plurality of second wireless communication devices,
each of the first wireless communication device and the plurality of second wireless communication devices is a short-range wireless communication device that communicates with the mobile terminal located in a communication range of the first wireless communication device to perform a wireless communication,
the communication range of the first wireless communication device covers the outside of the vehicle, and
the wireless communication performed by a respective second wireless communication device includes receiving, at the respective second wireless communication device, radio waves transmitted from the mobile terminal,
the method comprising:
the first wireless communication device detecting the mobile terminal located in the communication range of the first wireless communication device covering the outside of the vehicle;
in response to detecting the mobile terminal, the first wireless communication device performing an activation control to activate the plurality of second wireless communication devices; and
estimating the location of the mobile terminal on the outside of the vehicle based on results of the receiving, at the plurality of second wireless communication devices activated by the first wireless communication device, of the radio waves transmitted from the mobile terminal.

10. A method performed by a subject wireless communication device in a short-range wireless communication system mounted on a vehicle for estimating a location of a mobile terminal on an outside of the vehicle,
wherein
the short-range wireless communication system includes a first wireless communication device and a plurality of second wireless communication devices,
each of the first wireless communication device and the plurality of second wireless communication devices is a short-range wireless communication device that communicates with the mobile terminal located in a communication range of the first wireless communication device to perform a wireless communication, and
the communication range of the first wireless communication device covers the outside of the vehicle,
the wireless communication performed by a respective second wireless communication device includes receiving, at the respective second wireless communication device, radio waves transmitted from the mobile terminal,
the subject wireless communication device is one of the plurality of second wireless communication devices,
the method comprising:
the subject wireless communication device turning from a deactivated state into an activated state, upon the first wireless communication device performing an activation control to activate the plurality of second wireless communication devices in response to the first wireless communication device detecting the mobile terminal; and
the plurality of second wireless communication devices, including the subject wireless communication device, each providing a result of the receiving the radio waves transmitted from the mobile terminal, causing the location of the mobile terminal on the outside of the vehicle to be estimated based on results of the receiving, at the plurality of second wireless communication devices activated by the first wireless communication device, the radio waves transmitted from the mobile terminal.

\* \* \* \* \*